J. NADEAU.
SPAR TREE CAP.
APPLICATION FILED MAY 24, 1921.
1,389,968.
Patented Sept. 6, 1921.
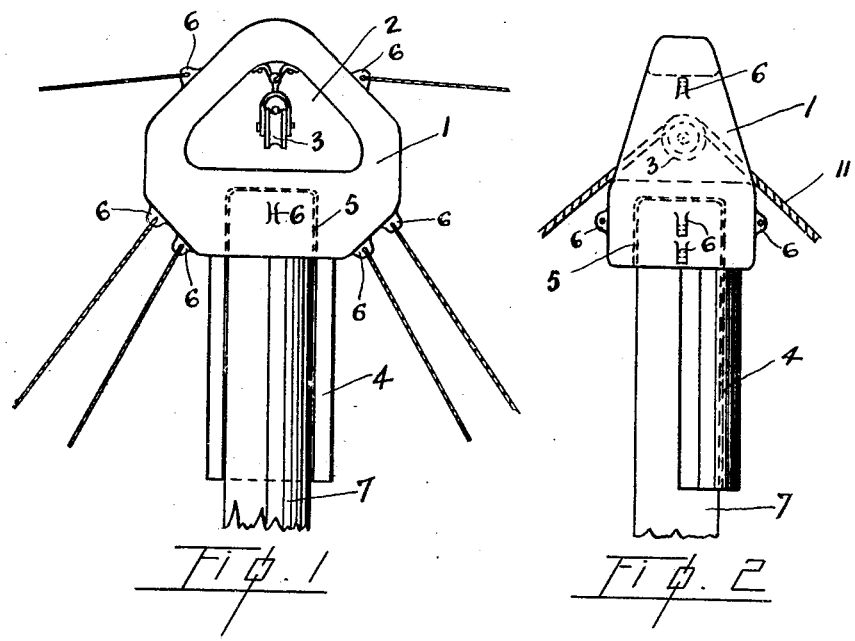
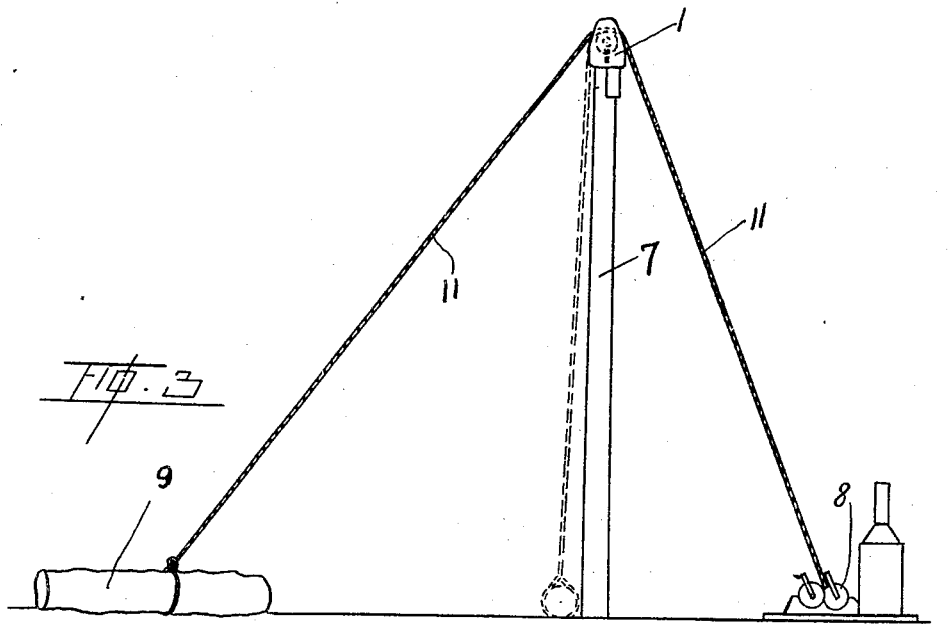
INVENTOR
JOSEPH NADEAU
BY
ATT'YS.

UNITED STATES PATENT OFFICE.

JOSEPH NADEAU, OF PORT ALBERNI, BRITISH COLUMBIA, CANADA.

SPAR-TREE CAP.

1,389,968.  Specification of Letters Patent.  Patented Sept. 6, 1921.

Application filed May 24, 1921. Serial No. 472,215.

*To all whom it may concern:*

Be it known that I, JOSEPH NADEAU, a citizen of the United States, and a resident of Port Alberni, in the Province of British Columbia, Canada, have invented certain new and and useful Improvements in Spar-Tree Caps, of which the following is a specification.

My invention relates to improvements in spar tree caps, and the oject of my invention is to devise a cap adapted to be fitted on the top end of a spar tree used in yarding operations, the use of which enables great economy of time to be effected and prevents damage to the spar such as occurs at the present time and which cap is strong, simple, and easily mounted in place.

I attain this object by the construction illustrated in the accompanying drawings in which—

Figure 1 is a front view of the device.

Fig. 2 is a side view.

Fig. 3 is a view illustrating the practical application of the invention.

Similar figures of reference indicate similar parts throughout the several views.

The device consists of a strong casting or block 1 having an opening 2 in which is mounted a sheave 3, the sheave being hung from the upper edge of the opening. The casting 1 is provided on its lower face with a semi-cylindrical extension 4, the bore of which communicates with an annular recess 5 formed in the lower face of the casting and which extends upwardly to within a short distance from the lower edge of the opening 2. On the front and rear faces and on its opposite sides the block is provided with eyed lugs 6, as shown.

7 indicates a spar tree, 8 the yarding donkey, and 9 a log.

The manner in which the device is used will be readily apparent on reference being had to Fig. 3. The cap is placed directly on the top end of the spar tree, the end of which fits the recess 5 and extension 4, and is securely held in place by guy lines 10 connected to the respective lugs 6, as shown in Fig. 1, and led to suitable points, and tightened up, so that the sheave 3 for the high lead cable is thus centrally positioned above the end of the tree in an effective manner instead of being tied to the tree at a point intermediate its length, a practice which makes for loss of time and efficiency while at the same time the tree is generally damaged by the fastening wire cutting into it under strain.

When the cap is in position the cable 11 is led from the donkey 8 over and through the sheave 3 so that its free end may be connected to the log, which may then be hauled to the foot of the spar tree for loading, as will be well understood by those skilled in the art.

From the foregoing it will be seen that I have devised a strong, simple and practical cap for the upper end of spar trees which enables the hauling line sheave to be mounted in an effective central position and which saves time and protects the tree.

What I claim as my invention is:—

1. A spar tree cap comprising a block recessed in its lower end to fit the upper end of the spar tree and having an aperture in its upper end, a sheave hung from the upper side of the aperture, and lugs on the block to which the ends of guy lines may be secured.

2. A spar tree cap comprising a block recessed concentrically in its lower end to fit the upper end of the spar tree and having an aperture in its upper end, said block being provided with a semi-cylindrical extension depending from its lower end concentric with the recess, and lugs on the block to which the ends of guy lines may be secured.

Dated at Port Alberni, B. C., this 25th day of April, 1921.

JOSEPH NADEAU.